United States Patent Office 3,589,909
Patented June 29, 1971

3,589,909
GUM CONFECTIONS CONTAINING DEXTROSE
AND 5–15 D.E. STARCH HYDROLYSATE
Martin M. Godzicki and Bruce A. Kimball, Chicago,
Ill., assignors to Corn Products Company
No Drawing. Filed Oct. 31, 1968, Ser. No. 772,367
Int. Cl. A23g 3/00
U.S. Cl. 99—134                                    12 Claims

ABSTRACT OF THE DISCLOSURE

Dextrose in combination with a starch hydrolystate having a D.E. of about 5 to 25 replaces sucrose in a gum confection to thereby reduce drying time and improve resiliency, strength, firmness, tenderness, and skin formation.

---

This invention relates to gum confections. More particularly this invention relates to improved gum confections and methods of making same by replacing at least a portion of the sucrose therein with dextrose in combination with a low D.E. starch hydrolysate.

Gum confections, or by another name, starch jellies, are well known in the art and their well known definition is incorporated herein by reference. Examples of these gum confections include gum drops, gum slices, jelly beans, gum centered candies, and the like.

Gum confections are generally comprised of three basic constituents, (a) a sweetening constituent, (b) starch, and (c) water. Other ingredients include various flavoring materials, preservatives, coloring agents, and like. The term "sweetening constituent" is used herein to define those ingredients which are included in a gum confection to add sweetness to the confection. As used herein this term includes the use of a starch hydrolysate therein. For most conventional gum confections, the sweetening constituent is comprised of sucrose and corn syrup.

Gum confections comprised of the above-described three basic ingredients are usually formed by first cooking starch with water and the sweetening constituent until the starch is gelatinized, thereby forming a liquid hereinafter referred to as a syrup. The starch used may be any well known starch, corn starch being preferred. As stated above, the sweetening constituent is usually sucrose and corn syrup. The hot syrup so formed by the cooking step is next shaped and dried to set up a gel, whereupon a final product is produced.

Even under the most rigorously and efficiently controlled commercial techniques currently used to effect the above-described process for making gum confections, drying times are excessively long. Such inordinately prolonged drying procedures not only reduce production but necessitate the use of excessive space and drying molds which could otherwise be "recycled" into the production line.

For example, in one typical commercial technique for making gum confections the starch is cooked at atmospheric pressure in a sugar solution containing excess water, and the mixture is then subjected to a rolling boil until sufficient water is lost by evaporation to yield a syrup of the proper consistency. The end points are judged by a skilled candy maker by dipping a paddle into the hot syrup and observing the clarity and the consistency of the syrup as it drains from the paddle in a flat, sheet-like form. In more modern methods for making gum confections, the requisite amounts of starch, sucrose, corn syrup and water are cooked under pressure to super temperatures by steam injection or by use of a heat exchanger. This technique permits cooking on a continuous basis rather than by batches and additionally only requires the amount of water necessary to gelatinize the starch so as to form a syrup. Thus, the cooking time may be reduced.

After cooking, the subsequent steps in the process have remained virtually unchanged and unimproved for many years. The cooked syrup is continuously deposited in small measured portions into depressions in a bed of dry powdered molding starch which is contained in shallow trays. The surface of the bed of molding starch is first smoothed over and then imprinted with depressions of the desired shape, i.e., the crescent shaped orange slices or round hemi-spherical form of the conventional gum drop. The trays of molding starch generally are carried on a continuous belt and the hot syrup resulting from the cooking operation is automatically injected, as by depositing hopper, into the preformed depression. The freshly deposited gum confection is relatively soft and semi-fluid, and even when cooled, a considerable aging period is necessary for the development of desired gel structure. Desired gel structure is developed by formation first of an interior core and then by a light skin on the exterior. Upon sufficient skinning and core development, the confection may be removed from the mold but generally will still require further setting time to retain a permanent shape. Therefore, the gum confection frequently is allowed to remain in the mold until final shape is attained whereby the gum confection is sanded (sugared) and packaged. The necessary total drying time frequently reaches from one to several days. As stated above, such prolonged drying times are expensive and space consuming.

During drying several desired changes occur. For instance: (1) the deposited starch-sugar syrup gradually sets up to a firm gel, (2) the starch sugar syrup gradually loses water to the bed of molding starch, and (3) the surface of the gum confection (i.e. the skin) gradually develops the desired properties of gloss and smoothness as well as a firmness sufficient for subsequent panning or sugaring operations in final packaging.

To facilitate water exchange between the gel and the starch, the molding starch may be predried to approximately 5% to 8% moisture content, under which circumstances it gradually removes water from the confection, thus facilitating the development of a gel structure therein. If the temperature of the conditioning room is exceptionally high, the predrying of the molding starch is not necessary since moisture in the confection will migrate through the starch into the hot air.

After conditioning for the necessary period of time to effect the above desired characteristics (usually in the range from 24 to 72 hours at temperatures from ambient to about 70° C.) the gum confections are screened from the molding starch, panned or "sanded," i.e. given a coating of crystalline sugar, and packaged. The molding starch must then be redried to the requisite low moisture content for reuse.

In order for the final products so formed to be commercially acceptable, they must exhibit the necessary levels of tenderness, firmness, resiliency, and strength.

Although the prior art has generally been able to obtain acceptable products through careful production control, there is a definite need for improved gum confections and more economic processes for making them.

It is a purpose of this invention to fulfill the above need in the art by providing novel gum confection compositions, products, and methods of making the same. The gum confections of this invention not only require materially shorter drying times than those heretofore used, but also exhibit acceptable and, in many instances, superior skin formation and levels of firmness, resiliency, tenderness and strength.

Basically, the gum confection compositions contemplated by this invention comprise starch, water and a sweetening constituent which is comprised of corn syrup and dextrose in combination with a starch hydrolysate having a D.E. from about 5 to about 25. Optionally the gum confections may include other ingredients such as flavoring agents, coloring agents, preservatives, and the like, all of which are well known in the art. These compositions may also contain some sucrose, but usually the products made from sucrose-containing compositions are rather inferior when compared to those products wherein no sucrose is present. Thus it is preferred for the purposes of this invention, and in order to insure that the full benefits of this invention be realized, that the compositions herein be substantially sucrose free.

Generally speaking, these novel compositions may be formed by using water, starch, and other ingredients in the amounts heretofore prescribed by the prior art but with the substitution of a combination of dextrose and a low D.E. starch hydrolysate for the sucrose, such that the total weight of the sweetening constituent, including the hydrolysate, equals the amount of the sucrose and corn syrup sweetening constituent heretofore prescribed.

Combinations of starch hydrolysate and dextrose may be formulated using any ratio of these two ingredients as desired. For the purposes of this invention, however, it has been found that gum confections having materially reduced drying times and acceptable levels of resiliency, strength, firmness, tenderness and skin formation may be formed using mixtures comprised of about 20–80% by weight dextrose and about 80–20% by weight starch hydrolysate. Preferably the mixtures comprise about 20–60% by weight hydrolysate and about 80–40% by weight dextrose. Most preferably the mixtures contain about 60% by weight hydrolysate and about 40% by weight dextrose. In those instances where less than about 35% dextrose is employed, it has been found desirable to add a small amount of a conventional artificial sweetener to the mixture in order to insure that the final products have the necessary degree of sweetness.

From the above discussion it is seen that the preferred sweetening constituents now employed in gum confections according to the teachings of this invention comprise:

| | |
|---|---|
| (a) Corn syrup, (80–82% solids) | Usually from about 55% to about 85% by weight of the sweetening constituent. |
| (b) A combination of about 20% to about 80% by weight hydrolysate solids and from about 20% to about 80% by weight dextrose. | Usually from about 15% to about 45% by weight of the sweetening constituent. |
| (c) Artificial sweeteners | Usually in small amounts when hydrolysate is more than about 65% of the mixture of (b). |

The starch which may be used in the confections of this invention may be any well known starch conventionally used in gum confections generally. Preferably, however, corn starch is used. Most preferably, the corn starch has a fluidity of 40–70, and/or is cross-bonded, derivatized or otherwise modified to provide the desired gel strength and thermal gelatin for facilitation in processing.

The starch hydrolysates used in the confections of this invention are a relatively new class of starch materials. These starch hydrolysates are made by subjecting a source of starch to enzyme or acid treatment or a combination of both. It is important that the starch hydrolysate have a relatively low D.E. (dextrose equivalent) of say less than about 25 and most preferably have a D.E. in the range of from 5 to 25. The most preferred materials have a D.E. within the range of 5 to 15. Starch hydrolysates of this type have been found to be excellent agents useful in reducing moisture pick-up of normally hygroscopic edible foods whereas use of other hydrolysates having a D.E. substantially outside this range results in inferior products which show a tendency to become sticky.

The term D.E. is used herein to refer to the reducing sugars content of the dissolved solids in a starch hydrolysate expressed as percent dextrose as measured by the Luff-Schoorl method (NBS Circular C–40, page 195 as appearing in "Polarimetry, Saccharimetry, and the Sugars," authors Frederick J. Bates and Associates).

The initial starch which is subjected to hydrolytic treatment may be derived from a wide variety of starchy materials such as cereal starches, waxy starches, and/or root starches. Typical of these groups are corn starch, potato starch, tapioca starch, grain sorghum starch, waxy milo starch, waxy maize starch, rice starch and the like. The term "starch hydrolysate" as used herein encompasses hydrolyzed starchy materials derived from a wide variety of starch sources known in the industry.

As hereinbefore stated, the starch hydrolysates preferred for use in the present invention are those having a D.E. ranging from about 5 to about 25 and which are made by any number of specific methods.

In one method, referred to as Method A in Example 1, a starch such as a waxy starch is treated with a single enzyme application of bacterial alpha amylase. More specifically, an aqueous slurry of a waxy starch, having a solids content less than 50%, is subjected to the hydrolytic action of bacterial alpha amylase under suitable conditions of fermentation to produce a starch hydrolysate. The hydrolysate may be further characterized as having the sum of the percentages (dry basis) of saccharides therein with a degree of polymerization of 1 to 6 divided by the D.E. to provide a ratio greater than about 2.0. This ratio is referred to as the characteristic or descriptive ratio. Those low D.E. products having a descriptive ratio less than about 2 are somewhat undesirable in that they exhibit less water solubility and also tend to form haze in solution as compared to those products with a ratio of at least 2.

The same product as described above, may also be made via a number of other routes. For example, a mixture of starch and water having a solids content less than 50% may be first subjected to the hydrolytic action of a bacterial alpha amylase followed by a high temperature heating step to solubilize any unsolubilized starch. Since this temperature tends to inactivate the enzyme it is then necessary to cool the solubilized partial hydrolysate and subject it to a second hydrolysis by treatment with additional bacterial alpha amylase to obtain the final starch hydrolysate. This technique is referred to as Method B in Example 1.

A third method of making the preferred class of low D.E. starch hydrolysates referred to as Method C in Example 1, consists of hydrolyzing a mixture of starch and water by the action of acid to reach a D.E. between about 5 and about 15. The partial hydrolysate is subsequently subjected to the action of bacterial alpha amylase to obtain a starch hydrolysate having a D.E. of from about 10 to about 25.

A particularly preferred starch hydrolysate useful in the present invention has the following specifications: moisture content about 5% maximum and a D.E. from about 10–13. Alternatively, the hydrolysate may be in the form of a syrup of about 76% solids.

A typical example of a sucrose-free gum confection composition as contemplated by this invention comprises by weight composition, about 40–60% corn syrup (80–82% solids), about 30–50% by weight of a composition consisting essentially of 20–80% by weight hydrolysate solids and 80–20% by weight dextrose (optionally having added thereto a small amount of artificial sweetener), about 8–15% starch (d.b.) and about 10–12% water.

The above-described gum confection compositions of this invention may be readily and easily formed into a gum confection product by using the same conventional steps heretofore described for producing gum confections generally. For example, one technique which may be used comprises initially forming a solution by mixing the corn syrup and water together. To this solution there is then added with mixing, the dextrose-low D.E. starch hydrolysate composition until the combination is thoroughly dispersed. The starch is then added and the resulting slurry is mixed with constant agitation at a temperature of about 150–190° F. to insure complete mixing and wetting of the starch. The slurry is then cooked in a continuous cooker at a temperature above about 250° F. and at a feed rate of about 0.2 gallon/minute. The cooked composition is then placed in molds of predried starch having a moisture content of approximately 5% to 8%, and dried at ambient temperature.

As hereinbefore stated, drying times for the compositions of this invention are materially reduced. That is to say, drying times for the confections of this invention are usually substantially less than about 72 hours. In most instances the drying times are substantially less than 50 hours and in many instances are actually less than about 24 hours. In any case, at least partial and most preferably total replacement of sucrose with a combination of dextrose and low D.E. starch hydrolysate will reduce the drying time required for a particular composition.

After drying, the gum confections formed are found to possess the necessary smoothness, gloss, and firmness sufficient for subsequent panning or sugaring operations. After panning or sugaring the confections are packaged as desired. The products so formed exhibit acceptable, and ofttimes, substantially superior skin formation and levels of firmness, resiliency, tenderness, and strength.

It is understood, of course, that many modifications and other techniques may be used to formulate the gum confection compositions of this invention into final gum confection products. Generally speaking, all conventional processes and techniques that are currently used to form conventional gum confections, may be used to form the novel gum confections of this invention.

The following examples are presented to better illustrate the invention rather than to limit it.

EXAMPLE 1

The following specific procedures illustrate the above-described three basic methods for making the low D.E. starch hydrolysates used in this invention.

Method A.—One step enzyme technique

An aqueous starch slurry was prepared containing 30% solids by weight of waxy milo starch. The temperature of the slurry was raised and held between 85° C. and 92° C. A bacterial alpha amylase preparation was added in an amount just above 0.025% by weight of the starch over a period of slightly more than 30 minutes. The mixture was then held at the same temperature for an additional period of 30 minutes. The temperature was then reduced to below 80° C. and the conversion was allowed to continue until the desired D.E. was reached. The temperature of the mixture was then suddenly raised to about 120° C. in order to inactivate the enzyme and terminate the conversion.

Table 1 below sets forth typical saccharide analyses of low D.E. hydrolysates obtained in accordance with the above procedure. DP designates the ranges of polymerization. $DP_1$ represents the total quantity expressed in percent by weight dry basis of monosaccharides present in the hydrolysate. $DP_2$ represents the total quantity of disaccharides present in the hydrolysate and so forth.

TABLE 1.—TYPICAL SACCHARIDE ANALYSES

| Hydrolysate composition | D.E. | | | | |
| --- | --- | --- | --- | --- | --- |
|  | 5 | 10 | 15 | 20 | 25 |
| $DP_1$ | 0.1 | 0.3 | 0.7 | 1.4 | 2.4 |
| $DP_2$ | 1.3 | 3.4 | 5.3 | 7.6 | 9.7 |
| $DP_3$ | 1.8 | 4.3 | 6.9 | 9.4 | 12.0 |
| $DP_4$ | 1.8 | 3.5 | 5.2 | 6.9 | 8.6 |
| $DP_5$ | 1.8 | 3.6 | 5.5 | 7.4 | 9.3 |
| $DP_6$ | 3.3 | 7.0 | 10.6 | 14.3 | 18.0 |
| $DP_7$ and higher | 89.9 | 77.9 | 65.6 | 53.0 | 40.0 |
| Total $DP_{1 \to 6}$ | 10.1 | 22.1 | 34.4 | 47.0 | 60.0 |
| Descriptive ratio | 2.0 | 2.2 | 2.3 | 2.4 | 2.4 |

Method B.—Two step enzyme-enzyme technique

Unmodified corn starch was slurried in water to provide an aqueous suspension containing 28–32% by weight of the unmodified corn starch. The pH was at 7.5–8.0. To this mixture was added HT–1000 bacterial alpha amylase (manufactured and sold by Miles Chemical Laboratories) in an amount of 0.05% based on starch solids. This starch suspension was added over a 30 minute period to an agitated tank maintained at a temperature of 90–92° C. After completion of starch addition, liquefaction was continued for 60 minutes, at which time the hydrolysate was within the D.E. range of 2 to 5. The liquefied starch was then heated to 150° C. and held at this temperature for 8 minutes. The heat treatment destroyed residual enzyme activity and resulted in improved filtration rates and in decreased yield losses upon filtration.

Further saccharification to the final D.E. was accomplished by the addition of more HT–1000 bacterial alpha amylase after cooling the liquefied starch hydrolysate to a suitable temperature for conversion. The liquefied starch was cooled to 80–85° C. and HT–1000 added in an amount of 0.02% by weight starch solids. After 14 to 20 hours of conversion the desired terminal D.E. of 20 was obtained.

The final starch hydrolysate product was analyzed and the following analytical values were obtained.

TABLE 2

| | |
| --- | --- |
| D.E. | 20.7 |
| $DP_1$ | 2.4 |
| $DP_2$ | 7.5 |
| $DP_3$ | 10.8 |
| $DP_4$ | 8.0 |
| $DP_5$ | 6.8 |
| $DP_6$ | 15.1 |
| $DP_{7+}$ | 49.4 |
| Descriptive ratio | 2.4 |

Method C.—Two step, acid-enzyme technique

Several samples of corn starch (A, B and C) were slurried in water providing slurries having Baumés ranging from 14° to 22°. These slurries were partially acid hydrolyzed to a maximum of 15 D.E. The particular D.E. achieved by acid hydrolysis in each of the samples is set forth in Table 3 below. After acid hydrolysis, the slurry was neutralized to a pH between 6 and 7. The neutralized liquor was cooled to between 80 and 85° C., and dosed with bacterial alpha-amylase (HT–1000) in the quantity set forth below. A final D.E. of 19 to 21 was obtained in each of the samples in a period of time between 1 and 3 hours. The final conversion liquors are low in color. These liquors are easily refined and evaporated to about 42° Baumé to provide syrups. Dry products may also be obtained. Tables 3 and 4 below set forth the reaction conditions for conversion and the product analyses respectively.

TABLE 3.—ENZYME CONVERSION CONDITIONS

| Sample | D.E. of acid hydrolysate | Percent dry substance | Temp., °C. | pH | Enzyme, dose | Time, hours | Final D.E. |
|---|---|---|---|---|---|---|---|
| A | 15.2 | 38 | 80 | 6.5 | 0.01 | 1 | 19.7 |
| B | 12.9 | 37.5 | 85 | 6.5 | 0.05 | 2 | 20.2 |
| C | 10.3 | 38.1 | 85 | 6.5 | 0.1 | 2 | 21.8 |

TABLE 4.—PRODUCT ANALYSES

| Sample | Final D.E. | Percent dry substance | $DP_1$ | $DP_2$ | $DP_3$ | $DP_4$ | $DP_5$ | $DP_6$ | $DP_{7+}$ | Descriptive ratio |
|---|---|---|---|---|---|---|---|---|---|---|
| A | 19.7 | 72 | 3.9 | 5.8 | 8.3 | 7.2 | 7.3 | 10.2 | 57.4 | 2.1 |
| B | 20.2 | 72 | 2.3 | 5.9 | 8.5 | 6.4 | 6.6 | 12.6 | 57.7 | 2.1 |
| C | 21.8 | 75 | 2.3 | 8.3 | 10.9 | 8.1 | 9.2 | 16.9 | 44.3 | 2.5 |

EXAMPLE 2

In order to demonstrate the superiority of the confections of this invention various sample gum confections were made.

The first gum confection was formulated from a standard and well accepted sucrose based confection recipe using by weight composition, 47.4% corn syrup (82% solids), 31.2% sucrose, 10.4% (dry basis) corn starch (67 fluidity), and 11.0% water. This confection is referred to in Table 5 as the control.

The second type of gum confection was formulated by using different mixtures of dextrose and a starch hydrolysate produced according to Method A, Example 1 from waxy milo starch and having a D.E. of about 10. The hydrolysate exhibits substantially the same composition characteristics as the 10 D.E. starch hydrolysate in Table 1. Different combinations were used as a total replacement for the sucrose of the control composition and all other ingredients remained the same.

All confections were formulated by the same prescribed technique of initially forming a solution of the corn syrup in the water. Next, the sucrose, and mixture of hydrolysate and dextrose, were dispersed in the solution and thoroughly mixed therein. The starch was then added and the resulting slurry was mixed with constant agitation for 45 minutes at a temperature ranging from 185°–195° F. to insure complete mixing and wetting of the starch. The slurry was then cooked in a continuous cooker at 295° F. and at a slurry feed rate of 0.2 gallon/minute. The cooked compositions at approximately 79% solids, were then placed in predried starch molds and were dried at ambient room temperature until the starch gum confections were capable of being removed and sanded in a conventional manner. The following comparative data were recorded. The characteristics of resiliency, strength, firmness, and tenderness were rated on a four point system as follows:

1—poor
2—fair
3—good
4—excellent

Skin formation was rated on a three point basis as follows:

A—excellent
B—sticky
C—tough

TABLE 5

| | | | | | |
|---|---|---|---|---|---|
| Sucrose (percent replaced) | 0 | 100 | 100 | 100 | 100 |
| hydrolysate (percent of hydrolysate and dextrose mixture) | | 80 | 60 | 40 | 20 |
| Dextrose (percent of hydrolysate and dextrose mixture) | | 20 | 40 | 60 | 80 |
| Slurry tank temp., °F | 190 | 180 | 180 | 180 | 180 |
| Cook temp., °F | 295 | 295 | 295 | 295 | 295 |
| Percent deposited solids | 78.9 | 78.0 | 78.7 | 78.1 | 78.5 |
| Drying time, hrs | 55 | 22½ | 22 | 21½ | 20½ |
| Product analysis: | | | | | |
| Resiliency | 2 | 3 | 4 | 4 | 3 |
| Strength | 3 | 3 | 4 | 3 | 3 |
| Firmness | 2 | 3 | 4 | 2 | 3 |
| Tenderness | 3 | 1 | 4 | 3 | 3 |
| Skin | A | C | A | A | B |

In all instances in the above data, the drying times of the gum confections of this invention were less than half the drying times of the sucrose-based control which used the exact same confection formulation except for its sweetening constituent. Such improved drying characteristics result in substantial savings in time, money, production space, and tray equipment. All of the above confections of this invention, furthermore exhibit superiority in one or more of their resiliency, strength, firmness, and tenderness characteristics. This, coupled with such substantially improved drying times, makes them more desirable than the control. In this respect it is noted that the confection which used 80% hydrolysate and 20% dextrose exhibited a tough skin formation. This confection is particularly suitable for the chewy type gum confection. However, of the five confections representative of this invention, it may be the least desirable for most purposes. Particular attention is drawn to the gum confection which used as its sweetening constituent including hydrolysate, corn syrup along with a mixture of 40% dextrose and 60% hydrolysate. This product is superior in every way to the control and therefore constitutes a particularly preferred example of the compositions of this invention.

EXAMPLE 3

A gum confection is formed of the following basic ingredients, percentages being by weight composition, using the same basic procedure as set forth in Example 2. Slurry tank temperature is held at about 180° F. and cook temperature is 295° F. The deposited solids are about 78.5%.

INGREDIENTS

| | Percent |
|---|---|
| Corn syrup | 47.4 |
| 60% hydrolysate, 40% dextrose | 31.2 |
| Starch (d.b.) | 10.4 |
| Water | 11.0 |

The hydrolysate used is a starch hydrolysate produced according to Method B, Example 1 using unmodified corn starch and having a D.E. of about 10 and a descriptive ratio of at least about 2.0.

The resulting product is an excellent gum confection exhibiting high levels of resiliency, strength, firmness, tenderness and excellent skin formation. In addition drying times are materially reduced.

EXAMPLE 4

In another example, hydrolysate having a D.E. of 15 and in the form of an aqueous syrup having 76% solids is used in combination with dextrose in proportions such that the dry substance of dextrose to hydrolysate is 60:40. The same formulation as Example 2 is followed except that less water is added to the confection mix to adjust the total water content for the water present in the hydrolysate syrup.

The gum confection produced in accordance with the process of Example 2 exhibits the same qualities of the 60:40 sample in Example 2.

We claim:
1. A gum confection composition comprising water, starch, and a sweetening constituent, said sweetening constituent being comprised of a combination of dextrose and a starch hydrolysate having a D.E. from about 5 to about 15 and a descriptive ratio of at least about 2.0, wherein said combination comprises about 20% to about 80% by weight solids of said hydrolysate and about 80% to 20% by weight dextrose.

2. A gum confection composition according to claim 1 wherein said sweetening agent is substantially sucrose-free.

3. A sucrose-free gum confection composition according to claim 2 wherein said combination comprises about 20% to about 60% by weight solids of said hydrolysate and about 80% to about 40% by weight dextrose.

4. A sucrose-free gum confection composition according to claim 2 wherein said combination comprises about 60% by weight solids of said hydrolysate and about 40% by weight dextrose.

5. A sucrose-free gum confection composition according to claim 1 wherein said starch hydrolysate has a D.E. of about 10–13.

6. a sucrose-free gum confection composition comprising by weight composition, about 40% to about 60% corn syrup, about 30% to about 50% of a combination consisting essentially of 20% to about 80% by weight hydrolysate solids and about 80% to about 20% by weight dextrose, about 8% to about 15% starch, dry basis, and about 10–12% water, wherein said hydrolysate has a D.E. from about 10 to about 13 and a descriptive ratio of at least about 2.0.

7. In a method for making a sucrose-free gum confection the improvement which comprises preparing a sweetening constituent of the gum confection which contains a combination of dextrose and a starch hydrolysate having a D.E. from about 5 to about 15 and a descriptive ratio of at least about 2.0 wherein the combination comprises from about 20% to about 80% dextrose and about 80% to about 20% starch hydrolysate solids, said sweetening constituent being prepared by admixing the combination of dextrose and hydrolysate with a liquid sweetener and water to disperse the liquid sweetener and combination in the water, adding starch to the resulting dispersion, heating the resulting slurry to gelatinize the starch, and form a hot syrup, and shaping and drying the hot syrup to yield an improved gum confection.

8. The method according to claim 7 wherein the sweetening constituent contains from about 55% to about 85% by weight corn syrup and from about 45% to about 15% by weight of a combination of dextrose and the starch hydrolysate.

9. The method according to claim 7 wherein the starch hydrolysate has a maximum moisture content of about 5% and a D.E. from about 10 to about 13.

10. The method according to claim 7 wherein the starch hydrolysate is a syrup containing about 76% solids and having a D.E. from about 10 to about 13.

11. The method according to claim 7 including the step of drying the confection in less than about 50 hours at ambient temperature.

12. The method according to claim 11 wherein the drying time is less than about 24 hours.

References Cited
UNITED STATES PATENTS

| | | | |
|---|---|---|---|
| 1,928,901 | 10/1933 | Krno et al. | 99—134 |
| 3,332,783 | 7/1967 | Frey | 99—134 |
| 3,490,922 | 1/1970 | Hurst | 99—142 |

JOSEPH M. GOLIAN, Primary Examiner